United States Patent
Lee et al.

(10) Patent No.: US 7,782,785 B2
(45) Date of Patent: Aug. 24, 2010

(54) METHOD AND APPARATUS FOR OPTIMIZING A QUEUE BASED CROSS LAYER IN A WIRELESS AD-HOC NETWORK

(75) Inventors: Su-Won Lee, Seongnam-si (KR); Yongsuk Park, Seoul (KR); Jong-Ho Bang, Suwon-si (KR); Jean Walrand, Berkeley, CA (US); Jeong-Hoon Mo, Daejeon (KR); Jae-Wook Kwak, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 598 days.

(21) Appl. No.: 11/713,082

(22) Filed: Mar. 2, 2007

(65) Prior Publication Data

US 2007/0274220 A1 Nov. 29, 2007

Related U.S. Application Data

(60) Provisional application No. 60/778,095, filed on Mar. 2, 2006.

(30) Foreign Application Priority Data

Sep. 5, 2006 (KR) ............... 10-2006-0085355

(51) Int. Cl.
*H04L 12/28* (2006.01)
(52) U.S. Cl. ................... 370/238; 370/338
(58) Field of Classification Search ............. 370/235, 370/238, 338, 230, 230.1, 252, 412, 448, 370/469
See application file for complete search history.

(56) References Cited

U.S. PATENT DOCUMENTS

| | | | |
|---|---|---|---|
| 2003/0037167 A1* | 2/2003 | Garcia-Luna-Aceves et al. | 709/238 |
| 2006/0206857 A1* | 9/2006 | Liu et al. | 717/104 |
| 2007/0102508 A1* | 5/2007 | McIntosh | 235/379 |
| 2007/0195702 A1* | 8/2007 | Yuen et al. | 370/238 |

* cited by examiner

*Primary Examiner*—Brian D Nguyen
(74) *Attorney, Agent, or Firm*—NSIP Law (57) ABSTRACT

A method and apparatus for optimizing a cross layer in an ad-hoc wireless network are provided. A link price is set using the number of packets of a queue. A flow rate is set using the link price. A channel access rank is set by comparing the link price with a link price of a neighboring node. A channel access backoff time is set based on the channel access rank. The method and apparatus for optimization may not be subject to interference and can simultaneously obtain fairness and efficiency while adaptively setting link capacities.

16 Claims, 8 Drawing Sheets

Optimal Algorithm

(a) Source Rate

(b) Queue Size

FIG.7

LQF – MIS Algorithm (a) Source Rate (b) Queue Size

METHOD AND APPARATUS FOR OPTIMIZING A QUEUE BASED CROSS LAYER IN A WIRELESS AD-HOC NETWORK

CROSS-REFERENCE TO RELATED APPLICATION

This application claims benefit under 35 U.S.C. §119(e) of U.S. Patent Application No. 60/778,095 filed on Mar. 2, 2006 in the United States Patent and Trademark Office and under 35 U.S.C. §119(a) of Korean Patent Application No. 2006-85355, filed on Sep. 5, 2006 in the Korean Intellectual Property Office, the entire disclosure of which is hereby incorporated by reference.

BACKGROUND OF THE INVENTION

1. Field of the Invention

The present invention relates to a method and apparatus for optimizing an ad-hoc network. More particularly, the present invention relates to a method and apparatus in which congestion is controlled in a transport layer and media access is controlled in a Media Access Control (MAC) layer using the number of packets of a queue.

2. Description of the Related Art

Traditionally, optimization for wireless and wired networks can be differentiated according to at least two factors.

The first factor that differentiates a wired network from a wireless network is interference. Interference is not a major factor during optimization in a wired network, whereas, in a wireless network, interference is a major factor such that two neighboring nodes may not be able to simultaneously transmit. Upon simultaneous transmission, the interference between two neighboring nodes may be so high, that the transmissions are prone to failure.

The second factor that differentiates a wired network from a wireless network is link capacity. Specifically, a wired network can easily set the link capacity, whereas a wireless network has difficulty in setting link capacity. Nodes may contend for resources according to local positions in a wireless ad-hoc network. For this reason, a wireless ad-hoc network may not know the link capacity among various parameters required for an algorithm.

A conventional clique-based method for optimization is modeled by introducing a maximal clique concept into a graph theory. In this case, nodes form a contention region according to positions and a maximal clique is formed on a generated contention graph.

The clique-based method may have difficulties in finding a clique in a distributed manner on an ad-hoc network. An improved process is needed to constantly maintain the same clique price between nodes belonging to the same clique. Also, the clique-based method has another problem in that an undesired result value is obtained when a network topology does not form a perfect graph. That is, the clique-based method has an imperfect form in practice.

Accordingly, there is a need for a method and apparatus for improving transmission interference during optimization of wireless ad-hoc networks

SUMMARY OF THE INVENTION

Exemplary embodiments of the present invention address at least the problems and/or disadvantages and provide at least the advantages described below. Accordingly, an aspect of exemplary embodiments of the present invention is to provide an improved method and apparatus for cross-layer optimization in a wireless ad-hoc network by controlling congestion in a transport layer using the size of a queue and controlling media access using a rank based on a congestion price in a MAC layer.

Another aspect of exemplary embodiments of the present invention is to provide a method and apparatus for optimizing an ad-hoc network for controlling congestion and setting a link price, a flow price, and a flow rate using a queue size in a transport layer.

Another aspect of exemplary embodiments of the present invention is to provide a method and apparatus for setting a rank using a price and setting a backoff time on the basis of the rank in a MAC layer for optimizing in an ad-hoc network.

Another aspect of exemplary embodiments of the present invention is to provide a method and apparatus for optimizing a cross layer in an ad-hoc network comprising setting a link price using the number of packets of a queue, setting a flow rate using the link price, setting a channel access rank by comparing the link price with a link price of a neighboring node and setting a channel access backoff time based on the channel access rank.

Another aspect of exemplary embodiments of the present invention is to provide a method and apparatus for optimizing an ad-hoc network for controlling congestion in a transport layer, comprising setting a price of a link using the number of packets in a queue of the link, setting a flow price using the link price and a price of a neighboring link and setting a flow rate using the flow price.

Another aspect of exemplary embodiments of the present invention is to provide a method and apparatus for controlling media access in a MAC layer for optimizing an ad-hoc network comprising broadcasting a computed price based on a queue to a neighboring node, setting a channel access rank by comparing the computed price with a link price broadcast from the neighboring node and setting a channel access backoff time using the channel access rank.

Another aspect of exemplary embodiments of the present invention is to provide an apparatus for controlling a cross layer for optimizing an ad-hoc network comprising a memory for storing information comprising the number of packets of a queue and a controller, connected to the memory, for controlling cross-layer optimization, where the controller sets a link price using the number of packets of the queue, sets a flow rate using the link price, sets a channel access rank by comparing the link price with a link price of a neighboring node and sets a channel access backoff time based on the channel access rank.

Another aspect of exemplary embodiments of the present invention is to provide an apparatus for controlling congestion in a transport layer for optimizing an ad-hoc wireless network, comprising a memory for storing information comprising the number of packets of a queue and a controller, connected to the memory, for controlling cross-layer optimization, where the controller periodically monitors a queue size and sets a price of a link using the number of packets in the queue of the link, sets a flow price using the link price and a price of a neighboring link and sets a flow rate using the flow price.

Another aspect of exemplary embodiments of the present invention is to provide an apparatus for controlling media access in a MAC layer for optimizing an ad-hoc wireless ad-hoc network, comprising a memory for storing information comprising the number of packets of a queue and a controller, connected to the memory, for controlling cross-layer optimization, where the controller broadcasts a computed price based on the queue to a neighboring node, sets a channel access rank by receiving a price from the neighboring node and compares the computed price with the received price and sets a channel access backoff time using the channel access rank.

BRIEF DESCRIPTION OF THE DRAWINGS

The above and other exemplary features and advantages of certain exemplary embodiments of the present invention will become more apparent from the following detailed description of certain embodiments thereof when taken in conjunction with the accompanying drawings, in which.

Throughout the drawings, like reference numerals will be understood to refer to like elements, features and structures.

DETAILED DESCRIPTION OF THE EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Exemplary embodiments of the present invention provide a method and apparatus for optimization for use in an ad-hoc network. In particular, the present invention proposes a method and apparatus for optimization for controlling congestion in a transport layer and media access in a Media Access Control (MAC) layer for optimization using the number of packets of a queue. Exemplary embodiments of the present invention use a cross-layer optimization using the transport layer and the MAC layer for a cross layer.

According to exemplary embodiments of the present invention, a method for congestion control for optimization in the transport layer periodically monitors a queue size and computes a link price. Accordingly, the link price and a price of a neighboring node can be used to compute a flow price using the flow price. Because the flow rate is computed using the queue size, it can be used for the method for congestion control.

According to exemplary embodiments of the present invention, a channel access rank of each node can be set using prices based on a queue size in the MAC layer. Accordingly, media access can be controlled by the introduction of the channel access rank to set a backoff time. Herein, the backoff time can be a channel access backoff time. In a process for setting the channel access rank, a price of each node can be broadcasted. Then, each node can compare its own price with a price of a neighboring node and each node can set a channel access rank in a longest queue first scheme and set a channel access backoff time.

Exemplary embodiments of the present invention can provide a cross-layer optimization method for use in an ad-hoc network by introducing a method for pricing according to actually available queue size. In terms of fairness and efficiency, exemplary embodiments of the present invention provide optimal bandwidth allocation in an ad-hoc network. Further, an algorithm proposed in the exemplary embodiments of the present invention can be easily implemented with relatively small overhead.

(1) Exemplary Congestion Control Method of a Transport Layer for Optimization

Figure 1:
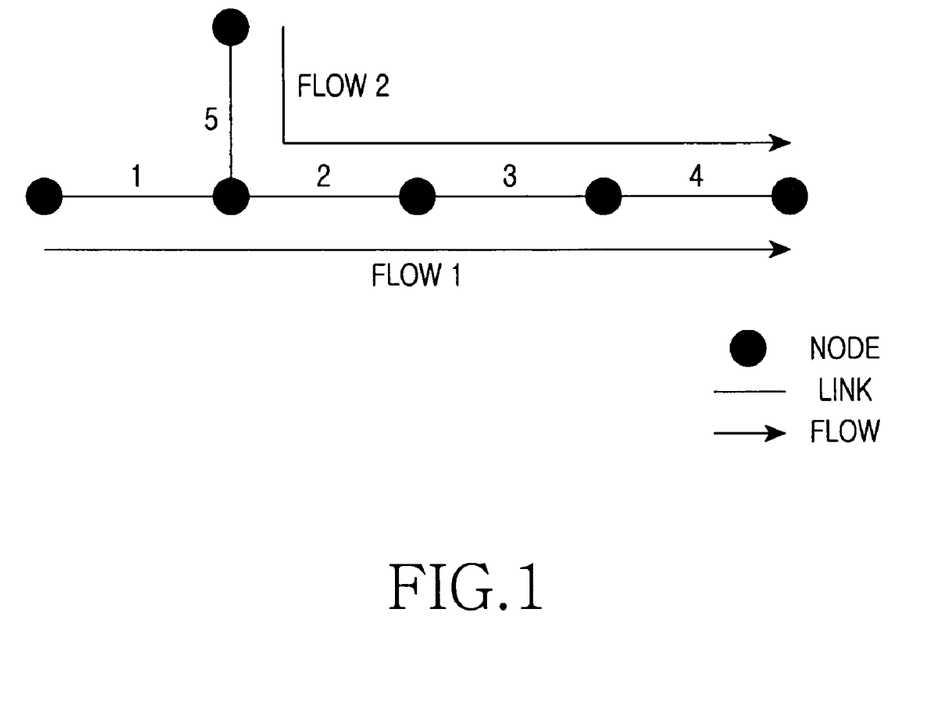
FIG. 1 illustrates links and flows between nodes according to an exemplary embodiment of the present invention.
Figure 2:
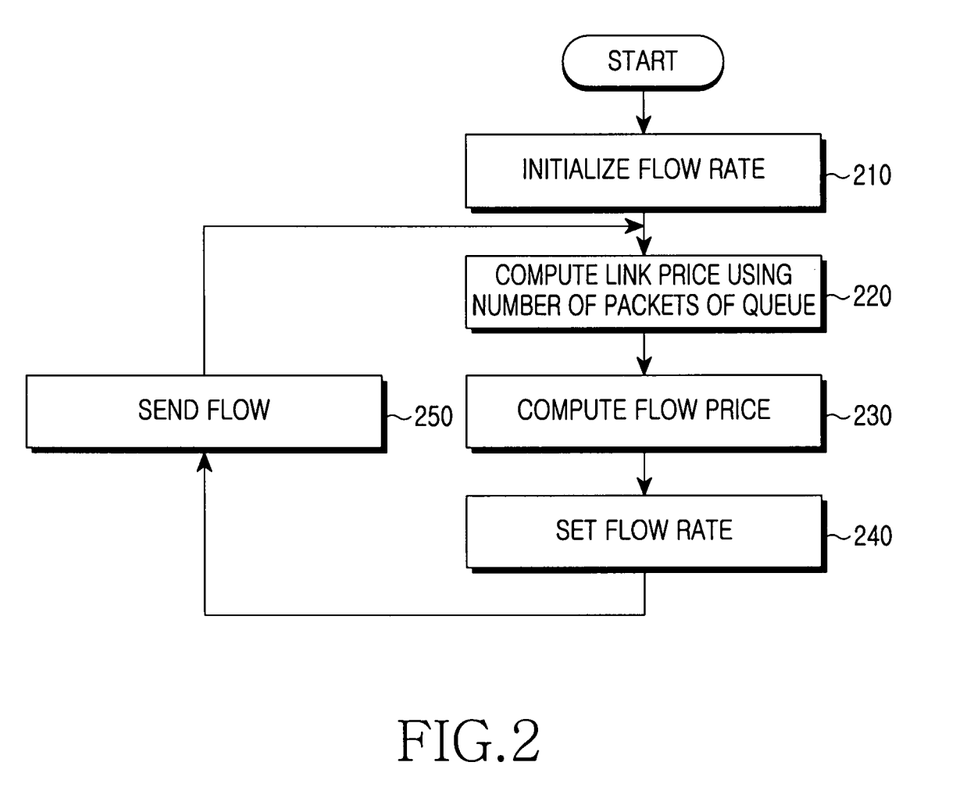
FIG. 2 is a flowchart illustrating a method for controlling congestion in a transport layer for optimizing an ad-hoc wireless network according to an exemplary embodiment of the present invention.

FIGS. 1 and 2 illustrate a method for controlling congestion in a transport layer for optimizing an ad-hoc wireless network according to an exemplary embodiment of the present invention.

According to exemplary embodiments of the present invention, the method for controlling congestion sets a price of a link using the number of packets in a queue of the link where a flow price is set using the link price and a price of a neighboring link. Thereafter, a flow rate is set using the flow price and a node updates the flow rate by repeating a series of the processes when receiving a subsequent flow.

In an exemplary embodiment of the present invention, a method for computing a link price in an ad-hoc network can directly estimate a price by periodically monitoring a queue size of a link. The price can be computed using a queue based pricing algorithm where the queue based pricing algorithm estimates an average value on the basis of old price values.

According to exemplary embodiments of the present invention, a method for optimizing an ad-hoc wireless network can utilize a moving average equation as the queue based pricing algorithm, as shown in Equation (1) below. A moving average equation computes a price of a link using a queue size and can be replaced with another equation using the queue based pricing algorithm.

$$\lambda_l(t+1) = [(1-\alpha) \cdot \lambda_l(t) + \alpha \cdot q_l(t)]^+ \quad (1)$$

According to an example, in Equation (1) above, $\alpha$ can be a small positive integer, $q$ can be the number of packets in a queue of a link l, $\lambda$ can be a price of the link l and "+" can be an operator for taking only an integer part computed by discarding a part after the decimal point in a real number.

A moving average equation considers a queue size as a value mapped to a congestion price and computes a price value. Further, a moving average equation estimates an average on the basis of old prices. A moving average equation can make estimation based on old values of flows in an actual asynchronous network and can be based on a fluid model.

According to an exemplary embodiment, if each link price is computed, a flow price and a flow rate can be computed using the link price in a rate control algorithm as shown in Equation (2) below. A rate control algorithm, as shown in Equation (2), is an exemplary equation for computing the flow price and the flow rate and can be replaced with an equation using a price of neighboring node and a price of each link.

$$\lambda_s = \sum_{l \in s} \sum_{n \in N(l)} \lambda_n \qquad (2)$$

$$\bar{\lambda}_s(t+1) = [(1-\beta) \cdot \bar{\lambda}_s(t) + \beta \cdot \lambda_s(t)]^+$$

$$x_s = \max(x_{max}, U^{t-1}(\bar{\lambda}_s) \cdot w)$$

According to an example in Equation (2) above, n can be a neighboring node belonging to a link l. The link l belongs to a flow s. β can be a small positive integer. w can be a rate control factor capable of being expressed by $$\frac{x_{max}}{\bar{\lambda}_s}.$$

In the first line of Equation (2) above, $\lambda$, is the sum of prices of links neighboring to a link through which the flow s passes. In the second line of Equation (2) above, $\lambda_s(t)$ is an actually measured value at a particular time t using the first-line equation and $\bar{\lambda}_s$ uses a (moving) average value up to the time t. In the third line of Equation (2) above, $\bar{\lambda}_s$ is a finally saturated value.

According to an exemplary embodiment of the present invention, the rate control algorithm can increase the efficiency of a network by adding the sum of neighboring links. That is, the rate control algorithm avoids the degradation of the overall network efficiency when a link passing through many neighboring nodes is frequently used. Since a price is a relative value, a rate of a flow using a link can be reduced by adding prices of links neighboring to each link. The decrease in the flow rate can lead to an increase in the overall network efficiency.

FIGS. 1 and 2 illustrate a method for controlling congestion in a transport layer for optimizing an ad-hoc wireless network according to an exemplary embodiment of the present invention.

According to an exemplary embodiment illustrated in FIG. 1, the ad-hoc wireless network illustrates 6 nodes, 5 links and 2 flows. For example, flow 1 is formed by links 1, 2, 3 and 4 and flow 2 is formed by links 5, 2, 3 and 4. According to exemplary embodiments of the present invention, each node can compute and set a link price using a queue size. When the link price is added to prices of neighboring nodes, the efficiency can increase. When the prices of the neighboring nodes are added, an ad-hoc network can perform more adaptive bandwidth allocation.

FIG. 2 is a flow chart illustrating a method according to an exemplary embodiment of the present invention for controlling congestion of a transport layer in an ad-hoc wireless network where a flow price can be computed by adding prices of links belonging to one flow. A flow rate can be set using the flow price. FIG. 2 describes a node initializing a flow rate, 210, a node computing a link price using the number of packets of a queue (wherein the link price can be more adaptively exploited when prices of neighboring nodes are added), 220, a node computing a flow price, 230, a node setting a flow rate, 240 and a node transmitting/sending a flow for computing the link price, 250.

(2) Exemplary MAC of MAC Layer for Optimization

Figure 3:
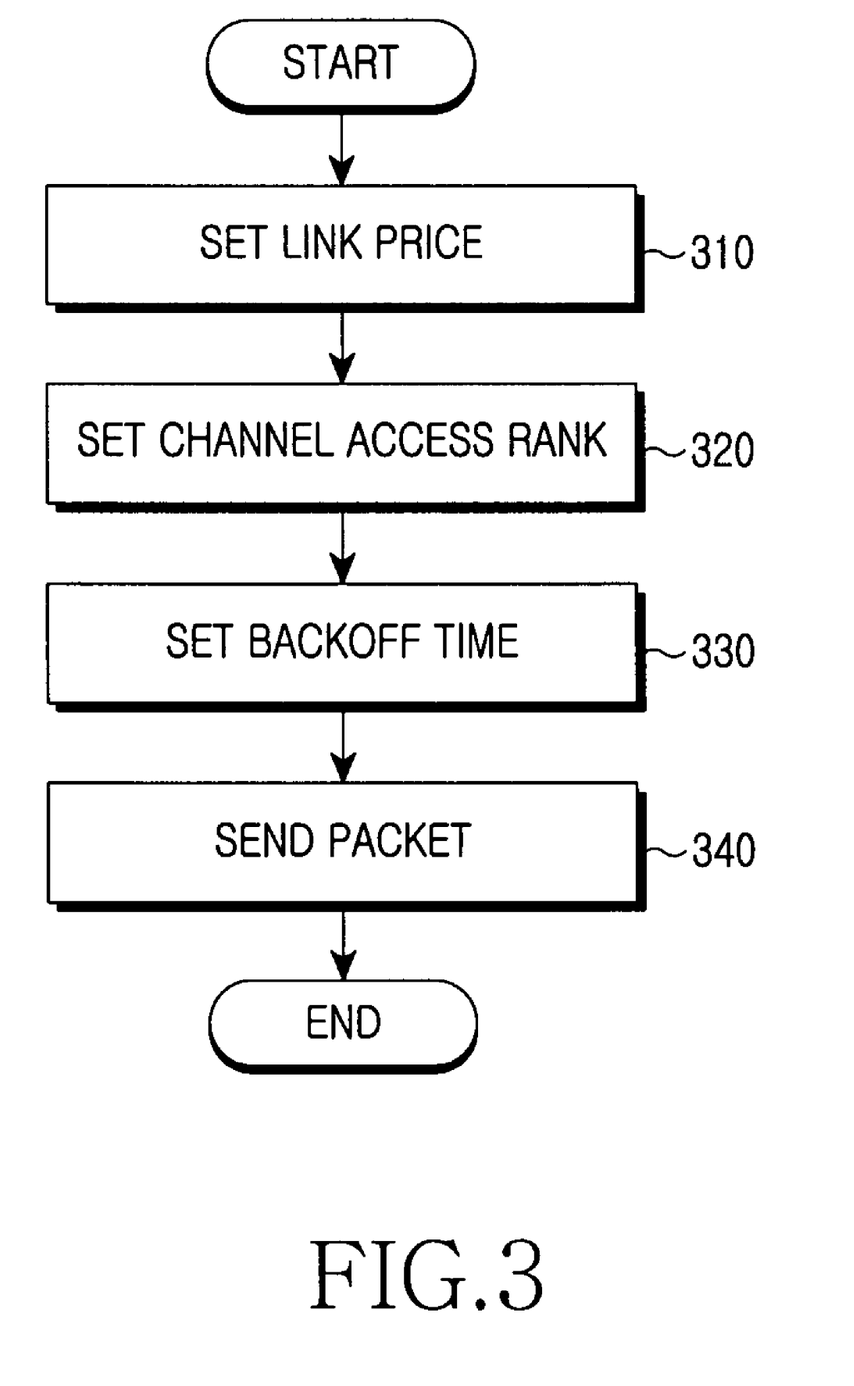
FIG. 3 is a flowchart illustrating a method for controlling media access in a MAC layer for optimizing an ad-hoc wireless network according to an exemplary embodiment of the present invention.
Figure 4:
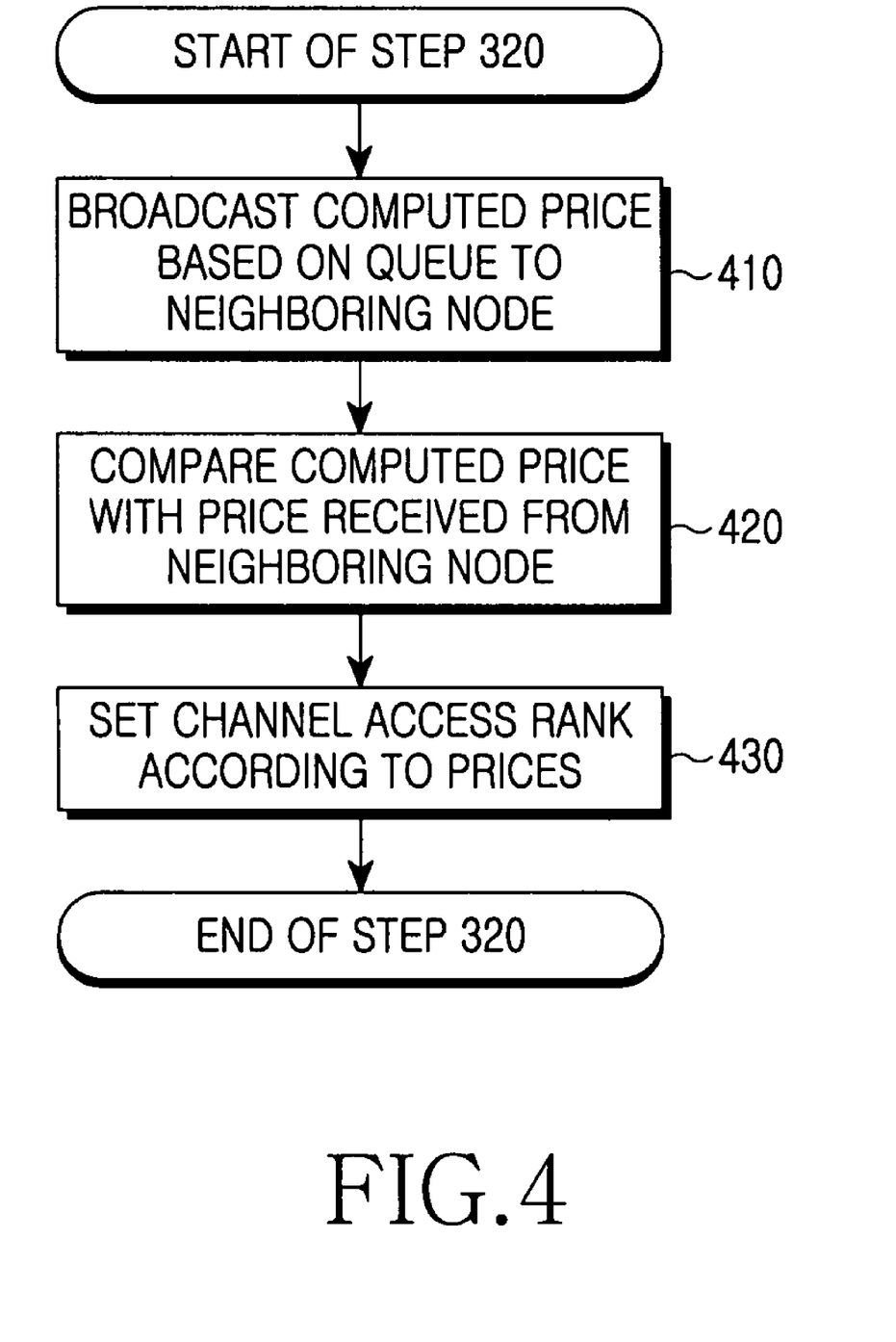
FIG. 4 is a flowchart illustrating a process for setting a channel access rank in MAC for optimizing an ad-hoc wireless network according to an exemplary embodiment of the present invention.

FIGS. 3 and 4 illustrate a method for controlling media access of a MAC layer for optimizing an ad-hoc wireless network according to an exemplary embodiment of the present invention, using a longest queue first-maximal independent set (LQF_MIS) algorithm.

A LQF-MIS algorithm is a heuristic algorithm for assigning priority to a node in which a congestion price is the highest. In a LQF-MIS algorithm, each node broadcasts a computed price value based on a queue to a neighboring node. In a LQF-MIS algorithm, each node compares its current price with a price received from the neighboring node and sets its channel access rank. Then, a LQF-MIS algorithm can set a channel access backoff time using the set channel access rank.

According to an exemplary embodiment of the present invention, the channel access backoff time can be set using the channel access rank according to prices. When the channel access backoff time is set using the channel access rank, it can be computed using Equation (3) below.

$$\text{backoff}_i = \text{rank}(i) \cdot cw(r) + \lfloor \text{Rand}(\ ) \cdot cw(r) \rfloor \times \text{SlotTime} \qquad (3)$$

Herein, rank(i) is the rank of a node i, cw(r) is a contention window (CW) value used at an r-th reattempt, Rand is an arbitrary value between 0 and 1 and SlotTime is a time of a slot. Equation (3) above uses the rank and can be replaced with another equation using the rank.

FIG. 3 is a flow chart illustrating a method for optimizing a MAC in an ad-hoc wireless network according to an exemplary embodiment of the present invention. FIG. 3 describes a node computing a link price, 310, a node computing a rank using the link price, 320, a node setting a backoff time, 330, and a node transmitting/setting a packet, 340.

A method for setting a rank in the MAC method in accordance with the exemplary embodiment of the present invention will be described with reference to FIG. 4.

FIG. 4 is a flow chart further illustrating a method for computing a rank using a link price for optimizing an ad-hoc wireless network according to an exemplary embodiment of the present invention. FIG. 4 describes each node broadcasting a computed price based on a queue to a neighboring node, 410, each node comparing its current price with prices received from neighboring nodes, 420 and each node setting a rank based on the prices, 430.

(3) Exemplary Method for Cross-Layer Optimization

Figure 5:
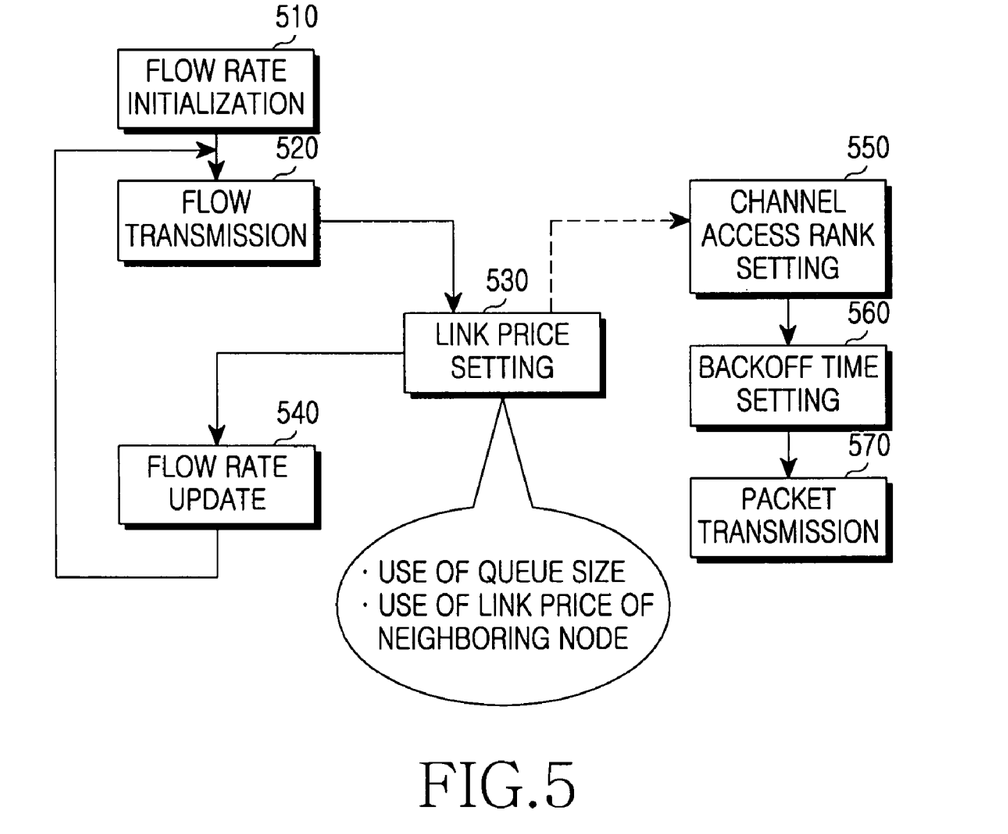
FIG. 5 is a flowchart illustrating a method for cross-layer optimization of an ad-hoc wireless network according to an exemplary embodiment of the present invention.

FIG. 5 illustrates a method for cross-layer optimization in an ad-hoc network according to an exemplary embodiment of the present invention.

According to an exemplary embodiment of the present invention, a method for cross-layer optimization uses a transport layer and a MAC layer. The transport layer controls congestion using the number of packets for optimization wherein the number of packets of a queue is used to compute a price of a link. Additionally, the MAC layer can control media access for optimization wherein, the media access is controlled by setting a channel access rank using a price of each link where the rank is also used to set the backoff time.

FIG. 5 is a flow chart illustrating a method for cross-layer optimization using a transport layer of a node. FIG. 5 describes initializing a node a specific rate, 510, transmitting a flow required to compute a link price, 520, and computing/setting the link price, 530. Wherein the link price is computed using the number of packets of a queue and a link price of a neighboring node. Thereafter, the node updates a flow rate using the computed link price, 540. The flow update process is achieved by repeating, for each node in the link, transmission a flow required to compute a link price, 520, computing/setting the link price, 530, and updating a flow rate using the computed link price, 540.

Next, the flowchart in FIG. 5 illustrates the operation of the MAC layer of a node. After the node computes a link price, 530, it computes a channel access rank, 550. The channel rank is set by a priority using a longest queue first scheme. The priority is set by computing the rank of a broadcast price of each link. For example, the node sets a backoff time using the rank, 560, and then the node transmits a packet, 570.

In an exemplary embodiment of the present invention, a method for optimizing an ad-hoc wireless network detects a near-maximal traffic flow rate at which a service is possible. The possibility of actual implementation is low due to a non-deterministic polynomial time (NP)-complete problem. An exemplary embodiment of the present invention provides an algorithm capable of being actually implemented. Because a service flow rate can be relatively uniformly implemented, according to exemplary embodiments of the present invention, different from the existing scheme, a relatively fair service can be provided to individual traffic elements that are different from each other.

Because the link capacity between nodes of a wireless network is not fixedly ensured in the conventional schemes, it is difficult to detect maximal traffic flow. However, the method for optimizing a wireless network, according to an exemplary embodiment of the present invention, can detect a maximal traffic flow in which a service is possible in the transport layer when controlling congestion because a flow rate is set in a new scheme based on queue information in the transport layer. According to an exemplary embodiment of the present invention, a flow rate can be adaptively set by considering a queue situation of a neighboring node.

A traffic flow can be controlled in a cross-layer scheme. According to an exemplary embodiment of the present invention, the cross-layer scheme uses a new link price concept based on queue information upon scheduling in the MAC layer. Through this cross-layer scheme, a service can be first provided to a relatively congested link and a maximal traffic flow can be reasonably derived.

The method for optimizing an ad-hoc wireless network, according to exemplary embodiments of the present invention, can provide a service for an application requiring Quality of Service (QoS) on a wireless ad-hoc network. Exemplary embodiments of the present invention can obtain efficiency of the overall system and can also use a fair band between flows. Thus, when the method for optimizing, according to exemplary embodiments, is used, the QoS and service area of a multimedia application based on a mobile device can be improved and extended.

The method for optimizing an ad-hoc wireless network, according to exemplary embodiments of the present invention, can provide solutions for a high-quality multimedia application and differentiated services in wireless ad-hoc network markets. Thus, according to exemplary embodiments of the present invention, a service area based on the wireless ad-hoc network can be extended and various service models can be provided.

(4) Exemplary Simulations of a Method for Optimization

FIGS. 6 to 9 illustrate topologies and simulation results in accordance with an exemplary embodiment of the present invention, where the simulation results are MATLAB simulation results. In the simulations, it is assumed that a utility function of a flow uses a logarithmic function.

(4-1) Simple Topology

Figure 6:
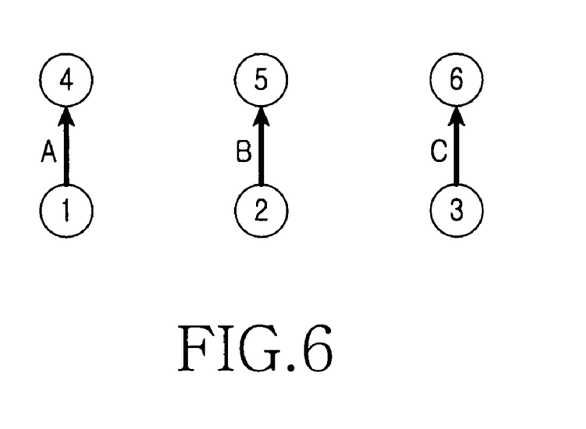
FIGS. 6 to 9 illustrate topologies and simulation results in accordance with an exemplary embodiment of the present invention.

Using simulation results for the topology illustrated in FIG. 6, a heuristic algorithm may be measured.

Specifically, referring to Table 1, an optimal algorithm converges to a point $$x^* = \left(\frac{2}{3}, \frac{1}{3}, \frac{2}{3}\right).$$

It can be seen that an LQF-MIS algorithm in accordance with an exemplary embodiment of the present invention converges to $$x^* = \left(\frac{3}{5}, \frac{2}{5}, \frac{3}{5}\right).$$

It can also be seen that the algorithm in accordance with the exemplary embodiment of the present invention exhibits the best performance in terms of fairness. However, it can be seen that the algorithm in accordance with the exemplary embodiment of the present invention has lower performance than the optimal algorithm in terms of resource use efficiency. A performance difference between the two algorithms is very small.

TABLE 1

| Variables | x1 | x2 | x3 | Σlog(x) |
| --- | --- | --- | --- | --- |
| Aloha Model | 1/3 | 1/12 | 1/3 | −4.6821 |
| Clique Model | 2/3 | 1/3 | 2/3 | −1.9095 |
| Independent Set Model | 2/3 | 1/3 | 2/3 | −1.9095 |
| LQF-MIS | 3/5 | 2/5 | 3/5 | −1.9379 |

Figure 7:
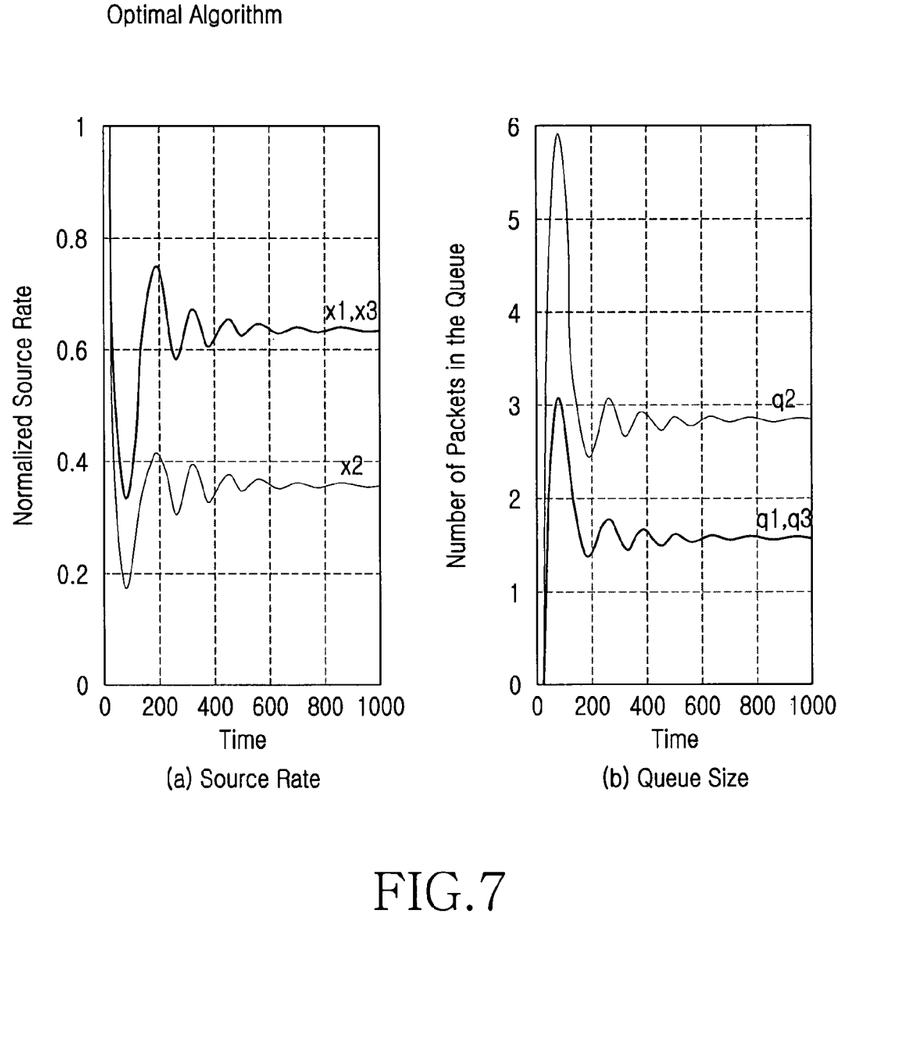

FIG. 7 illustrates a link queue size and a flow rate of a source in an optimal algorithm, according to an exemplary embodiment of the present invention. Referring to FIG. 7 graph (a), the flow rate converges to an optimal value as time goes on. Referring to FIG. 7 graph (b), the link queue size converges to an optimal value as time goes on. The optimal algorithm can be implemented in a centralized version, because computation for retrieving an independent set from a network requires global network information. Thus, the optimal algorithm is compared with the LQF-MIS algorithm of FIG. 8.

Figure 8:
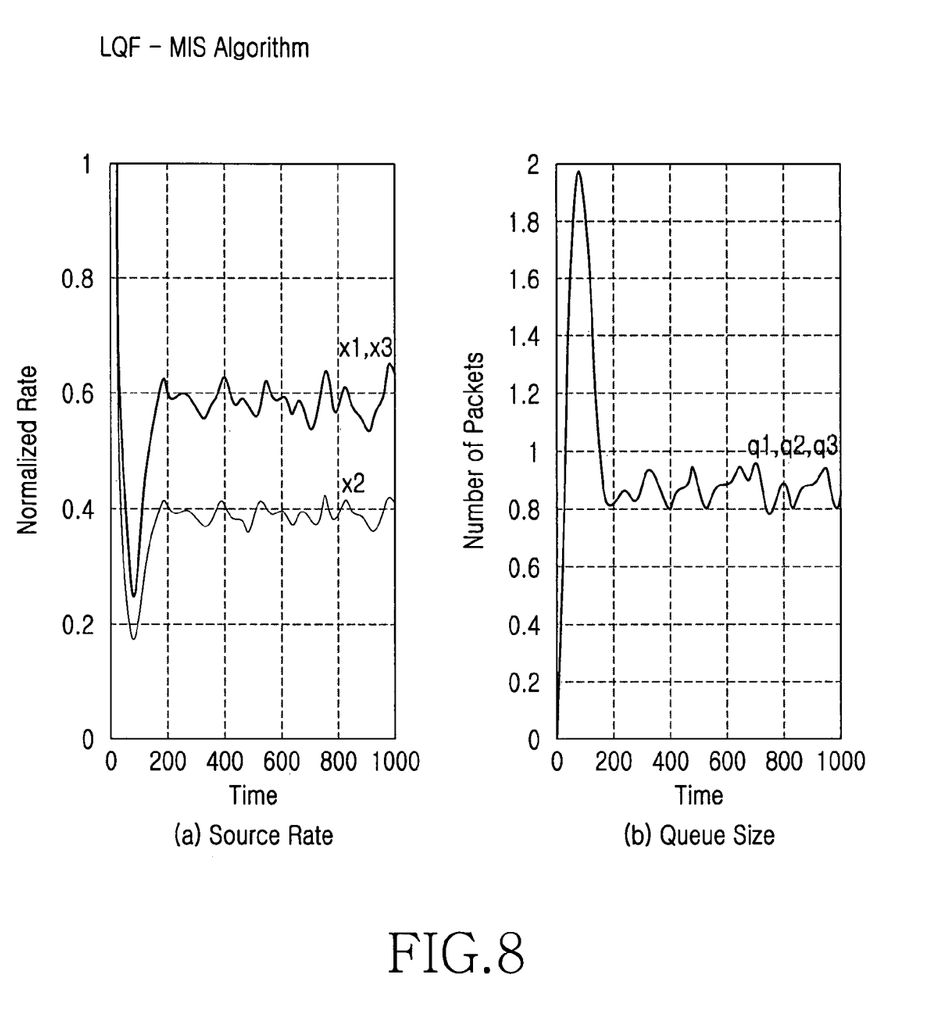

FIG. 8 illustrates results of the LQF-MIS algorithm where the optimal algorithm is compared with the LQF-MIS, according to an exemplary embodiment of the present invention. Table 2 shows a comparison between the optimal algorithm and the LQF-MIS algorithm in a more complex topology, according to an exemplary embodiment of the present invention. As shown in Table 2, exemplary implementations of the present invention outperform the optimal algorithm in terms of fairness even when the number of flows increases.

TABLE 2

| Number of | Optimal Alg. | | LQF-MIS | |
| --- | --- | --- | --- | --- |
| Inner Flows | Outer Flows | Inner Flows | Outer Flows | Inner Flows |
| 1 | 0.6651 | 0.3345 | 0.5890 | 0.3924 |
| 2 | 0.5002 | 0.2496 | 0.4228 | 0.2820 |
| 4 | 0.3516 | 0.1632 | 0.2713 | 0.1815 |
| 8 | 0.2151 | 0.0987 | 0.1577 | 0.1054 |

(4-2) Pentagon Topology

Figure 9:
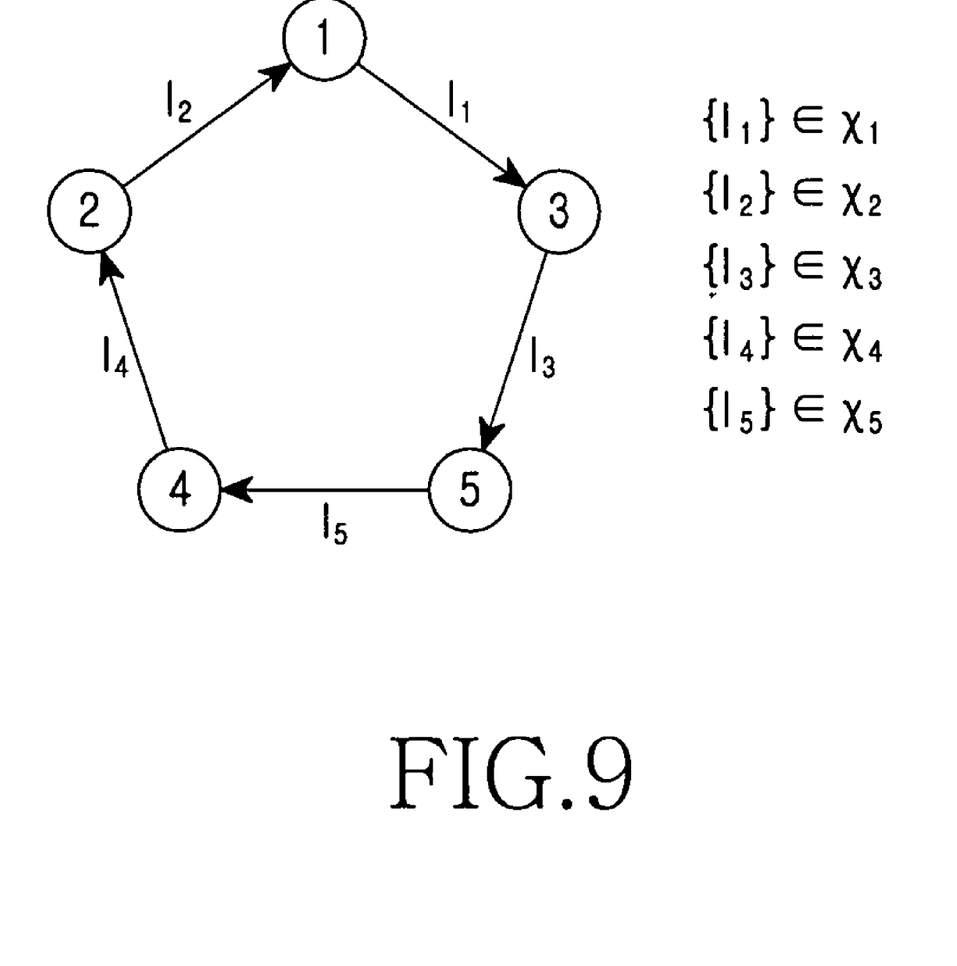

Graph-theoretic modeling has a problem when a network topology does not form a perfect graph. For example, when the pentagon topology is provided as illustrated in FIG. 9, a clique-based algorithm shows a result of $$x^* = \left(\frac{1}{2}, \frac{1}{2}, \frac{1}{2}, \frac{1}{2}, \frac{1}{2}\right).$$

This is infeasible flow rate allocation.

However, an algorithm in accordance with an exemplary embodiment of the present invention can constantly generate the feasible solution. That is, the exemplary embodiment of the present invention can generate the solution even though a topology does not have a perfect graph. Table 3 shows results when algorithms were used in the pentagon topology. Among the conventional algorithms, the clique-based algorithm is maximal in network resource use efficiency, but its resource allocation is infeasible. It can be seen that the proposed LQF-MIS algorithm has the same performance as the optimal algorithm in terms of both fairness and resource use efficiency.

TABLE 3

| Variables | x1 | x2 | x3 | x4 | x5 | Σlog(x) |
|---|---|---|---|---|---|---|
| Aloha Model | 4/27 | 4/27 | 4/27 | 4/27 | 4/27 | −9.5477 |
| Clique Model | ½ | ½ | ½ | ½ | ½ | −3.4657 |
| Independent Set Model | ⅖ | ⅖ | ⅖ | ⅖ | ⅖ | −4.5815 |
| LQF-MIS | ⅖ | ⅖ | ⅖ | ⅖ | ⅖ | −4.5815 |

(4-3) Simulation Result Analysis

According to analyzed simulation results, algorithms based on clique, ALOHA and Signal to Interference-Noise Ratio (SINR) have a problem in implementability, schedulability or efficiency.

A cross-layer based optimization algorithm can be efficiently used in a wireless ad-hoc network. According to an exemplary embodiment of the present invention, an optimization algorithm can express the link capacities as weighted sums of independent sets. According to an exemplary embodiment of the present invention, a heuristic algorithm can be implemented by exploiting the longest queue first policy and the neighborhood price.

Exemplary embodiments of the present invention provide a method for cross-layer optimization in a wireless ad-hoc network that is not subject to the effect of interference and can adaptively set link capacities.

Exemplary implementations of the present invention can set a maximal traffic flow capable of being served by setting a flow rate based on a queue situation in a transport layer and can first serve a congested link in scheduling based on queue information in a MAC layer.

Exemplary embodiments of the present invention provide a efficient method for optimizing a wireless ad-hoc network in the overall network and is fair between flows by providing a service for an application requiring QoS on a wireless ad-hoc network.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The methods describe above may also be embodied in transmission media, for example, carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. The described hardware devices may be configured to act as one or more software modules in order to perform the operations of the above-described exemplary embodiments of the present invention.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method performed by an apparatus for optimizing a cross layer in an ad-hoc network, the method comprising:
   setting a link price using a number of packets of a queue;
   setting a flow rate using the link price;
   setting a channel access rank by comparing the link price with a link price of a neighboring node; and
   setting a channel access backoff time based on the channel access rank.

2. The method of claim 1, wherein the setting of the link price comprises:
   periodically monitoring a size of the queue; and
   computing the link price using a queue based pricing algorithm.

3. The method of claim 1, wherein the setting of the link price comprises estimating an average link price based on an old link price.

4. The method of claim 1, wherein the setting of the link price comprises performing computation using a moving average method defined by:

$\lambda_l(t+1) = [(1-\alpha) \cdot \lambda_l(t) + \alpha \cdot q_l(t)]^+$, wherein α is a small positive integer, q is the number of packets in a queue of a link l λis a price of the link l, t is a particular time, and + is an operator for taking only an integer part computed by discarding the part after a decimal point in a real number.

5. The method of claim 1, wherein the setting of the flow rate comprises setting the flow rate using the link price of the neighboring node.

6. The method of claim 1, wherein setting of the flow rate comprises setting the flow rate using the price of the neighboring node derived from packet information broadcast from the neighboring node.

7. The method of claim 1, wherein the setting of the flow rate comprises setting the flow rate using a flow price, the flow price being set using an old flow price.

8. The method of claim 1, wherein setting of the flow rate comprises setting the flow rate using a flow price, a utility function and a rate control factor.

9. The method of claim 1, wherein setting of the flow rate comprises setting the flow rate using a flow price, the flow price being defined by:

$$\lambda_s = \sum_{l \in s} \sum_{n \in N(l)} \lambda_n \text{ and } \overline{\lambda}_s(t+1) = [(1-\beta) \cdot \overline{\lambda}_s(t) + \beta \cdot \lambda_s(t)]^+,$$

wherein n is a neighboring node of a link l belonging to a flow s , β is a small positive integer, w is a rate control factor for controlling a queue size and a flow rate, t is a particular time, + is an operator for taking only an integer part computed by discarding the part after a decimal point in a real number, λ is a price of the link l, and $\overline{\lambda}_s$ is a finally saturated value.

10. The method of claim 1, wherein setting of the flow rate comprises setting the flow rate using $x_s = \max(x_{max}, U^{l-1}(\overline{\lambda}_s) \cdot w)$, wherein x is the flow rate, U is a utility function, λ is a link price, w is a rate control factor, and $\overline{\lambda}_s$ is a finally saturated value.

11. The method of claim 1, wherein the setting of the channel access backoff time comprises:
broadcasting a computed price based on the queue to the neighboring node;
setting the channel access rank by receiving a price from the neighboring node and comparing the computed price with the received price; and
setting the channel access backoff time using the channel access rank.

12. The method of claim 1, wherein the setting of the channel access backoff time comprises computing the channel access backoff time defined using:

$$\text{backoff}_i = \text{rank}(i) \cdot cw(r) + \lfloor \text{Rand}(\ ) \cdot cw(r) \rfloor \times \text{SlotTime}$$

wherein rank (i) is a rank of a node i, cw(r) is a contention window (CW) value used at an r-th reattempt, Rand is an arbitrary value between 0 and 1, and SlotTime is a time of a slot.

13. The method of claim 1, further comprising:
receiving a subsequent flow and updating the link price; and
updating the flow rate using the updated link price.

14. A computer-readable recording medium storing a program for implementing the method of claim 1.

15. An apparatus for optimizing a cross layer in a wireless ad-hoc network, the apparatus comprising:
a memory for storing information comprising a number of packets of a queue; and
a controller, connected to the memory, for controlling cross-layer optimization, the controlling includes setting a link price using the number of packets of the queue, setting a flow rate using the link price, setting a channel access rank by comparing the link price with a link price of a neighboring node, and setting a channel access backoff time based on the channel access rank.

16. The apparatus of claim 15, wherein the controller sets an average link price and an average flow rate using old values.

* * * * *